United States Patent Office 2,890,196
Patented June 9, 1959

---

2,890,196

CURABLE COMPOSITION COMPRISING A DIEPOX-IDE, A POLYCARBOXYLIC ANHYDRIDE AND A POLYHYDRIC COMPOUND

Benjamin Phillips and Paul S. Starcher, Charleston, and Charles W. McGary, Jr., and Charles T. Patrick, Jr., South Charleston, W. Va., assignors to Union Carbide Corporation, a corporation of New York No Drawing. Application April 4, 1957
Serial No. 650,555

7 Claims. (Cl. 260—45.4)

This invention relates to novel, polymerizable, curable compositions; to polymerized cured compositions prepared therefrom and to methods of making the same. More particularly, this invention is directed to novel, polymerizable, curable epoxy-containing compositions and has for an object the provision of novel epoxy-containing compositions useful in the arts of molding, coatings, laminating, adhesives, castings and the like.

The curable compositions of this invention are low viscosity liquids at temperatures ranging upwards from room temperatures. Numerous advantages and objects can be attained by employment of the compositions of this invention. For example, these compositions can be employed with a wide variety of fillers and pigments, if desired, to adjust the composition viscosity and at the same time enhance the physical properties of resins formed therefrom. These compositions can be easily handled in such resin-forming applications as in coatings, bonding, laminating, molding, casting, potting and the like, without the need of solvents or diluents although such solvents or diluents can be used, if desired. In casting applications, these compositions can be made to fill small intricacies of molds without applying high-pressures or heating to high temperatures. In coating applications, they can be easily spread, brushed, or sprayed on surfaces by the many techniques available to the paint, lacquer and varnish industries. These curable compositions undergo negligible shrinkage when cured and are particularly useful in bonding, casting, molding and potting, wherein undue shrinkage is particularly undesirable. These compositions can be easily prepared using low temperatures at which no gelation occurs during preparation. However, they can be cured rapidly at higher temperatures. The pot lives of these compositions can be controlled, as desired. These compositions can be made with relatively short pot lives, of the order of a few minutes, with relatively long pot lives, of the order of several hours or of several days, or with pot lives of intermediate duration, as desired.

The cured resins are transparent and water-resistant. They can be made as hard, rigid, infusible products, as tough, flexible, infusible products or as products having intermediate degrees of hardness and rigidity or toughness and flexibility, as desired. These resins can be machined to desired shapes and configurations and can be polished to provide appealing finishes. They can be made as infusible products which are resistent to most organic solvents. These resins can also be made as products having high heat distortion values, and are capable of sustaining heavy loads at high temperatures. In accordance with this invention, resins having combinations of any one or several of these useful properties can be produced.

The novel compositions of the present invention are directed to polymerizable, curable compositions comprising (*a*) epoxides characterized by the general formula:

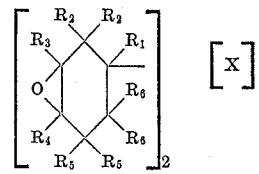

wherein X represents divalent radicals selected from the group consisting of

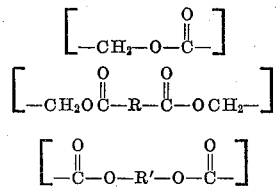

and $$\left[-\overset{O}{\overset{\|}{C}}-O-R'-O-\overset{O}{\overset{\|}{C}}-\right]$$

in which R represents members selected from the group consisting of aliphatic and aromatic hydrocarbon groups containing from two through twelve carbon atoms, R' represents members selected from the group consisting of lower aliphatic hydrocarbon groups and lower oxyalkylene groups and $R_1$ through $R_6$ represent hydrogen or lower alkyl groups; (*b*) a polycarboxylic acid anhydride in an amount having $x$ carboxyl equivalents per epoxy equivalent of said epoxide; and (*c*) a polyol in an amount having $z$ hydroxyl equivalents per epoxy equivalent of said epoxide, wherein $x$ is a number in the range of from 0.1 to 4.0; $z$ is a number in the range of from 0.01 to 1.0; the sum of $x$ and $z$ is not greater than 4.0; and $x/z$ is at least 1.0.

More particularly, the compositions of this invention are directed to polymerizable, curable compositions comprising (*a*) epoxides characterized by the general formula:

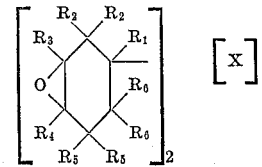

wherein X represents divalent radicals selected from the group consisting of

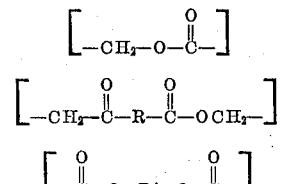

and $$\left[-\overset{O}{\overset{\|}{C}}-O-R'-O-\overset{O}{\overset{\|}{C}}-\right]$$

in which R represents members selected from the group consisting of aliphatic and aromatic hydrocarbon groups containing from two through twelve carbon atoms, R' represents members selected from the group consisting of lower aliphatic hydrocarbon groups and lower oxyalkylene groups and $R_1$ through $R_6$ represent hydrogen or lower alkyl groups; (*b*) a polycarboxylic acid anhydride, and preferably a dicarboxylic acid anhydride, in an amount having $x$ carboxyl equivalents per epoxy equivalent of said diepoxide; and (*c*) a polyol in an amount having $z$ hydroxyl equivalents per epoxy equivalent of said diepoxide, wherein $x$ is a number in the range of from 0.5 to 2.0; $z$ is a number in the range of from 0.01 to 1.0; the sum of $x$ and $z$ is not greater than 2.0; and $x/z$ is at least 1.0.

A preferred novel sub-class of the broadest embodiment of the invention is directed to polymerizable, curable compositions (*a*) a 3,4-epoxycyclohexylmethyl 3,4-epoxycyclohexanecarboxylate; (b) a dicarboxylic acid anhydride in an amount having x carboxyl equivalents per epoxy equivalent of said epoxide; and (c) a polyol in an amount having z hydroxyl equivalents per epoxy equivalent of said epoxide, wherein x is a number in the range of from 0.1 to 4.0; z is a number in the range of from 0.01 to 1.0; the sum of x and z is not greater than 4.0 and x/z is at least 1.0.

A particularly preferred novel sub-class of the broadest embodiment of the invention is directed to polymerizable, curable compositions comprising (a) a 3,4-epoxycyclohexylmethyl 3,4-epoxycyclohexanecarboxylate; (b) a dicarboxylic acid anhydride in an amount having x carboxyl equivalents per epoxy equivalent of said epoxide; and (c) a polyhydric alcohol in an amount having z hydroxyl equivalents per epoxy equivalent of said epoxide, wherein x is a number in the range of from 0.1 to 4.0; z is a number in the range of from 0.01 to 1.0; the sum of x and z is not greater than 4.0 and x/z is at least 1.0.

More particularly preferred novel sub-classes to which this invention is directed include (a) epoxides such as 3,4-epoxycyclohexylmethyl 3,4-epoxycyclohexanecarboxylate; and 3,4-epoxy-6-methylcyclohexylmethyl 3,4-epoxy-6-methylcyclohexanecarboxylate; (b) a dicarboxylic acid anhydride such as phthalic, maleic, chlorendic and succinic in an amount having x carboxyl equivalents per epoxy equivalent of said epoxide; and (c) a polyhydric alcohol such as ethylene glycol, diethylene glycol, triethylene glycol, glycerol, and 1,1,1-trimethylolethane, in an amount having z hydroxyl equivalents per epoxy equivalent of said epoxide, wherein x is a number in the range of from 0.1 to 4.0; z is a number in the range of from 0.01 to 1.0; the sum of x and z is not greater than 4.0; and x/z is at least 1.0.

The compositions of the invention can be prepared by mixing the epoxides described above with a polycarboxylic acid anhydride and a polyol. In making homogeneous compositions, it has been found to be advantageous to raise the temperature of the reaction mixture to at least the melting point of the highest melting component of the reaction mixture. Homogeneous compositions with liquid polyols and solid polycarboxylic acid anhydrides can be advantageously obtained by heating the anhydride to at least its melting point and then adding it to a mixture of the epoxide and polyol. Of course, any other sequence which involves the transformation of the anhydride to the liquid form may be employed to form a homogeneous composition. Similarly, homogeneous compositions can be obtained with solid polyols by first heating said polyols to at least the melting point.

Acidic and basic catalyst can be added, if desired, to accelerate the rate of curing or polymerization. Catalysts in amounts ranging up to 5.0 weight percent based on the weight of the diepoxide can be added at this point; at any time prior to curing or not at all, as desired. Higher catalyst concentrations above this range are also effective, although concentrations of 5.0 weight percent and below have been found to be adequate. Catalyst concentrations of 0.001 to 5.0 weight percent based on the weight of the diepoxide are particularly preferred. The compositions then can be cooled to room temperature and stored for future use, if desired, or used immediately. Other polyfunctional materials also may be incorporated into the curable compositions. Such polyfunctional materials include other polyepoxides, e.g., polyglycidyl ethers of polyhydric phenols and the like, low molecular weight urea-formaldehyde or phenol-formaldehyde polymers and the like. Many variations in the physical properties of the resin compositions can be obtained by employing such other polyfunctional materials in the curable compositions of this invention.

Curing can be carried out by maintaining the curable compositions at temperatures from about 50° C. to 250° C. Temperatures higher than 250° C. can be used, although some discoloration, which may not be desirable in the final product, may result. The time for effecting a complete cure can be varied from several minutes to several hours. While not wishing to be bound by any particular theory or mechanisms of reaction, it is believed that the curing or polymerization occurs as follows:

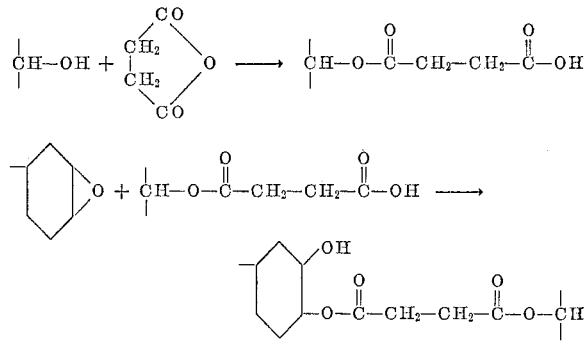

Since a hydroxyl group is generated, additional anhydride will serve to cross-link the polymer—or cross-linking can be accomplished through etherification (self-polymerization).

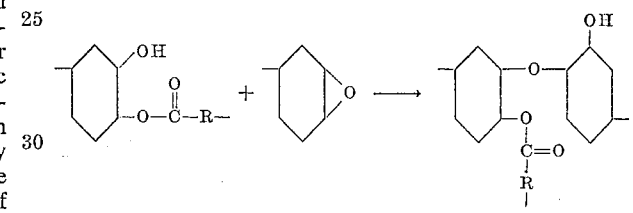

Also, if the polyal is tri- or tetra-functional, cross-linking can be obtained whether or not the generated hydroxyl is functional.

The particular embodiment of this invention involves the addition of a third component, (c) a polyol which leads to certain improvements in the curable compositions and the cured compositions. Thus, for example, it has been shown in the above mechanistic scheme that polyols serve to initiate the polymerization reaction and in fact, it has been found that lower curing temperatures and shorter periods of time are required for converting the curable compositions to cured compositions. Such reductions in the time required for curing are particularly advantageous in applications where long curing periods and higher curing temperatures are prohibitive, such as, in laminate applications where the presses must be released for continuous, rapid production and in electrical encapsulations where high temperatures are detrimental to sensitive electrical components. Certain curable compositions of this invention can be cured at room temperature, if desired, to give hard, rigid, strong resins. Another particular advantage of adding the third component, the polyol, is the control allowed in varying the physical properties of the cured compositions. Thus, for example, by using a highly functional polyol which does not have long flexible chains connecting the hydroxy groups, resins can be obtained which can withstand heavy loads at high temperatures. At the other extreme, a long-chain diol leads to cured resins which are tougher, softer, and more flexible. Thus, in addition to giving a more rapid cure, the polyol, allows a wide variety of formulations, the choice of which, would be determined by the application.

The curable compositions and cured compositions outlined in this invention also have the following improvements over certain compositions heretofore available. Thus, it has been shown that polyols and polycarboxylic acids or acid anhydrides can be mixed and pre-reacted in such proportions that polyesters are obtained which have free carboxyl groups. These acidic compositions were then mixed with polyepoxides to provide curable compositions. However, these polyesters tend to be relatively high melting and are very reactive at the melt temperatures making the curable compositions difficult to handle. The curable compositions in this invention however, have the advantages of being homogeneous at lower temperatures and furthermore, since the carboxyl groups are generated during the polymerization, the polymerization reaction occurs smoothly and longer pot-lives at lower temperatures are obtained. At higher temperatures, however, the anhydride-polyol reaction is very rapid and curing takes place very rapidly. In addition to the improvements in handling the curable compositions, the cured resins have the advantage of being harder and withstanding heavy loads at higher temperatures. The practical value of these characteristics have been discussed.

The compositions of this invention have been described above, in terms of epoxy equivalents, hydroxyl equivalents, and carboxyl equivalents. By the term "epoxy equivalent," as used herein, is meant the number of epoxy groups

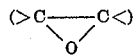

contained by a mol of epoxides described above. For example, one mol of 3,4-epoxy-6-methylcyclohexylmethyl 3,4-epoxy-6-methylcyclohexanecarboxylate contains two epoxy equivalents. The term "carboxyl equivalent," as employed herein, is intended to mean the number of carboxyl groups (—COOH) contained by a mol of a polycarboxylic acid anhydride. For example, the carboxyl equivalent of a dicarboxylic acid anhydride is the number of carboxyl groups which would be contained by an amount of the corresponding dicarboxylic acid. Thus, one mol of dicarboxylic acid anhydride would have a carboxyl equivalent of 2. The term "hydroxyl equivalent," as used herein, is intended to mean the number of hydroxyl groups (—OH) contained in a mol of polyol. Thus, for example, one mol of glycerol contains 3 hydroxyl equivalents since it contains 3 hydroxyl groups. Thus, in expressing the novel compositions of this invention, resort has been had to certain letters of the alphabet which are used to designate the relative proportions of the components of the systems, that is, polycarboxylic acid anhydrides and polyols, which provide useful compositions in accordance with the purposes and objects of the invention. Thus, the letter $x$ is used to signify the number of carboxyl equivalents (—COOH) per epoxide equivalent and the letter $z$ is used to signify the number of hydroxyl equivalents (—OH) per equivalent of epoxide. Since, as hereinbefore pointed out, useful compositions are obtained by employing equivalent proportions of polycarboxylic acid anhydride of from 0.1 to 4.0 equivalents of anhydride per equivalent of epoxide and from 0.01 to 1.0 equivalent of polyol per equivalent of epoxide, $x$ and $z$ will represent the number of carboxyl equivalents and hydroxyl equivalents, respectively, per epoxy equivalent; the sum of $x$ plus $z$ is not greater than 4.0; and the ratio of $x/z$ is at least 1.0 since the polycarboxylic acid anhydride is always the major component of the composition with respect to the polyol compound.

The polycarboxylic acid anhydrides useful in preparing the novel compositions of this invention include any and all anhydrides whether aliphatic, aromatic or cycloaliphatic in nature. The preferred anhydrides are the dicarboxylic acid anhydrides and preferably the hydrocarbon dicarboxylic acid anhydrides which include, for example, phthalic anhydride, tetrahydrophthalic anhydride, hexahydrophthalic anhydride, chlorendic anhydride, maleic anhydride, chloromaleic anhydride, dichloromaleic anhydride, glutaric anhydride, adipic anhydride, succinic anhydride, itaconic anhydride, heptylsuccinic anhydride, hexylsuccinic anhydride, methylbutylsuccinic anhydride, methyltetrahydrophthalic anhydride, n-nonenylsuccinic anhydride, octenylsuccinic anhydride, pentenylsuccinic anhydride, propylsuccinic anhydride, citraconic anhydride, 4-nitrophthalic anhydride, 1,2-naphthalic anhydride, 2,3-naphthalic anhydride, 1,8-naphthalic anhydride, tetrabromophthalic anhydride, tetraiodophthalic anhydride. Mixtures of anhydrides, polymeric anhydrides or mixed polymeric anhydrides of sebacic, adipic, pimelic, cyclohexane, 1,4-dicarboxylic, terephthalic and isophthalic acids are also useful in preparing the novel compositions of this invention. Polycarboxylic acid anhydrides, such as 1,2,4,5-benzenetetracarboxylic dianhydride and 1,5-dimethyl - 2,3,4,6,7,8 - hexahydronaphthalene - 3,4,7,8-tetracarboxylic dianhydride can also be used.

By the term "polyol," as used herein, is meant an organic compound having at least two hydroxyl groups which are alcoholic hydroxyl groups, phenolic hydroxyl groups or both alcoholic and phenolic hydroxyl groups. Typical polyols can be represented by the general formula:

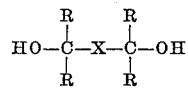

R is an alkyl group or hydrogen and can be the same or different for all R's in the molecule. X can be a single bond or a divalent group composed of a carbon atom or group of carbon atoms interconnected by single or multiple bonds and to which such groups as hydrogen, alkyl, hydroxyl, cyclic groups and the like or combinations thereof can be attached. X can also represent such divalent groups as oxyalkylene or polyoxyalkylene groups. X, as a divalent group may represent a carbon atom group which contains sulfur. It can also represent cyclic groups, such as phenylene, cyclohexylene and the like. The R's and X together with the carbon atoms, i.e., the C's of the formula, can represent a cyclic group such as phenylene, cyclohexylene and the like. The presence of other groups, with the exception of tautomeric enolic groups, not specifically listed herein are not participating in the curing reaction is by no means harmful and, in fact, can be useful in developing special properties in our resins. Mixtures of polyols or only one polyol can be employed in our curable compositions.

Representative polyols which can be employed in the compositions are polyhydric alcohols, such as ethylene glycol, diethylene glycol, polyethylene glycols, propylene glycol, dipropylene glycol, polypropylene glycols, polyethylenepolypropylene glycols, trimethylene glycol, butanediols, pentanediols, 2-ethyl-1,3-hexanediol, 2-methyl-2,4-pentanediol, 12,13-tetracosanediol, 2-butene-1,4-diol, 2-methoxymethyl-2,4-dimethyl-1,5-pentanediol, diethanolamine, triethanolamine, glycerol, polyglycerols, 1,1,1-trimethylol methane, 1,1,1-trimethylol ethane, pentaerythritol, sorbitol, polyvinyl alcohols, cyclohexanediols, cyclopentanediols, inositol, trimethylolphenol, and polyhydric phenols, such as dihydroxytoluenes, resorcinol, bis-(4-hydroxyphenyl)-2,2-propane, bis(4 - hydroxyphenyl) methane, the polyhydric phenolic-formaldehyde condensation products, and the like. Polyols which are free of acetylenic unsaturation and composed of carbon, hydrogen and oxygen combined as hydroxyl oxygen or ether oxygen connecting two otherwise unconnected carbon atoms and having not more than 24 carbon atoms are preferred.

The diepoxides hereinbefore described which are suitable for use in preparing the novel compositions of this invention include the 3,4-epoxycyclohexylmethyl 3,4-epoxycyclohexanecarboxylates; the aliphatic diol bis(3,4-epoxycyclohexanecarboxylates); and the bis(3,4-epoxycyclohexylmethyl) dicarboxylates.

The 3,4-epoxycyclohexylmethyl 3,4-epoxycyclohexanecarboxylates referred to above can be conveniently characterized by the following general formula:

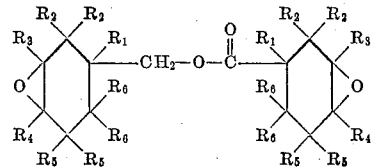

wherein $R_1$, $R_2$, $R_3$, $R_4$, $R_5$ and $R_6$ represent a hydrogen atom or an aliphatic hydrocarbon radical, and include 3,4-epoxycyclohexylmethyl 3,4-epoxycyclohexanecarboxylate; 3,4-epoxy-1-methylcyclohexymethyl 3,4-epoxy-1-methylcyclohexanecarboxylate; 3,4-epoxy-2-methylcyclohexylmethyl 3,4-epoxy-2-methylcyclohexanecarboxylate; 3,4-epoxy-6-methylcyclohexylmethyl 3,4-epoxy-6-methylcyclohexanecarboxylate; 3,4-epoxy-3-methylcyclohexylmethyl 3,4-epoxy-3-methylcyclohexanecarboxylate; 3,4-epoxy-4-methylcyclohexylmethyl 3,4-epoxy-4-methylcyclohexanecarboxylate; 3,4-epoxy-5-methylcyclohexylmethyl 3,4-epoxy-5-methylcyclohexanecarboxylate; and a lower alkyl substituted 3,4-epoxycyclohexylmethyl 3,4-epoxycyclohexanecarboxylate.

The aliphatic diol bis(3,4-epoxycyclohexanecarboxylates) include the dihydric alcohol diesters of acids selected from the group consisting of 3,4-epoxycyclohexanecarboxylic acid and lower alkyl substituted 3,4-epoxycyclohexanecarboxylic acids in which the hydroxyl groups of said dihydric alcohols are esterified by said acids and wherein said dihydric alcohol represents members selected from the group consisting of lower aliphatic hydrocarbon glycols and polyalkylene glycols corresponding to the general formula:

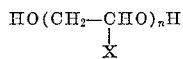

wherein X represents members selected from the group consisting of hydrogen and methyl groups and $n$ represents a positive integer in the range of from 2 through 3. Typical aliphatic diol bis(3,4-epoxycyclohexanecarboxylates) include ethylene glycol bis(3,4-epoxycyclohexanecarboxylate); 2-ethyl-1,3-hexanediol bis(3,4-epoxycyclohexanecarboxylate); 3-methyl-1,5-pentanediol bis(3,4-epoxycyclohexanecarboxylate); 1,5-pentanediol bis(3,4-epoxycyclohexanecarboxylate); and 1,6-hexanediol bis-(3,4-epoxycyclohexanecarboxylate).

The bis(3,4-epoxycyclohexylmethyl) dicarboxylates include the hydrocarbon dicarboxylic acid diesters of alcohols selected from the group consisting of 3,4-epoxycyclohexylmethanol and lower alkyl substituted 3,4-epoxycyclohexylmethanols in which the carboxyl groups of said dicarboxylic acid are esterified by said alcohols and wherein the dicarboxylic acid contains from 2 through 12 carbon atoms. Typical bis(3,4-epoxycyclohexylmethyl) dicarboxylates include bis(3,4-epoxycyclohexylmethyl) maleate; bis(3,4-epoxycyclohexylmethyl) pimelate; bis-(3,4-epoxy-6-methylcyclohexylmethyl) maleate; bis(3,4-epoxy-6-methylcyclohexylmethyl) succinate; and bis(3,4-epoxycyclohexylmethyl) terephthalate.

The process of the invention is carried out, generally, by heating to a temperature of about 25° C. to 200° C., a mixture comprising a 3,4-epoxycyclohexylmethyl 3,4-epoxycyclohexanecarboxylate, a polycarboxylic acid anhydride and a polyol. The preferred minimum temperature is that temperature at which the particular reaction mixture forms a homogeneous mass. Thus, with low-melting anhydrides, such as maleic anhydride, temperatures of about 30° C. are preferred, while with higher-melting anhydrides, such as phthalic anhydride, temperatures of about 100° C. are required. The temperature required for gelation within reasonable times is a temperature in the range of from 25° C. to 150° C. The heating times for gelation to occur generally vary from five minutes to five hours. This gelation time, however, can be significantly reduced by the use of various catalysts to accelerate the reaction. Typical catalysts include both acids and bases, such as sulfuric acid, stannic chloride, perchloric acid, pyridine, aniline, benzyldimethylamine, benzyltrimethylammonium hydroxide and dilute sodium hydroxide. Preferably, these catalysts are employed in an amount in the range of from 0.001 to 5.0 percent based on the weight of the diepoxide.

The curing of the gelated product may be allowed to proceed at the selected gelling temperature or, if desired, a more rapid cure can be had by raising the temperature as high as 250° C. It has been found that the time required for the formation of hard, transparent and insoluble resin generally varies from five to ten minutes up to two to six hours, depending on whether a catalyst is used; the amount of the catalyst present and the temperature employed.

Catalysts which can be employed with advantageous effects in accelerating the cure of our compositions are the basic and acidic catalysts including strong alkalies, mineral acids and metal halide Lewis acids. Typical strong alkalies include the alkali metal hydroxides, e.g., sodium hydroxide and potassium hydroxide, and quaternary ammonium compounds, e.g., benzyltrimethylammonium hydroxide, tetramethylammonium hydroxide and the like. Representative of mineral acids which can be used in speeding the formation of our resins are sulfuric acid, perchloric acid, polyphosphoric acid and the various sulfonic acids, such as ethane sulfonic acid, benzene sulfonic acid and the like. Metal halide Lewis acids which are also effective in speeding the cure of our resins include boron trifluoride, stannic chloride, zinc chloride, aluminum chloride, ferric chloride and the like. The metal halide Lewis acid catalysts can also be used in the form of such complexes as etherate complexes and amine complexes, for example, boron trifluoride-piperidine and boron trifluoridemonoethylamine complexes. In the form of a complex, the metal halide Lewis acid catalyst is believed to remain substantially inactive until released as by dissociation of the complex upon increasing the temperature. When released from the complex, the catalyst then exerts its catalytic effect.

Uniform dispersion of catalyst in our compositions prior to curing has been found to be desirable in order to obtain homogeneous resins and to minimize localized curing around catalyst particles. Agitation of the compositions containing catalyst is adequate when the catalyst is miscible with said compositions. When the two are immiscible, the catalyst can be added in a solvent. Typical solvents for the catalysts include organic ethers, e.g., diethyl ether, dipropyl ether, 2-methoxy-1-propanol, organic esters, e.g., methyl acetate, ethyl acetate, ethyl propionate, organic ketones, e.g., acetone methyl-isobutylketone, cyclohexanone, organic alcohols, e.g., methanol, cyclohexanol, propylene glycol and the like. The mineral acids and strong alkalies can be employed as solutions in water, whereas metal halide Lewis acid catalysts tend to decompose in water and aqueous solutions of such Lewis acids are not preferred.

The following examples will serve to illustrate the practice of the invention. Barcol hardness values were determined at room temperature with a Barcol Impressor GYZJ 934-1. Heat distortion values and Izod impact values were determined in accordance with ASTM methods D-648-45T and D-256-47T, respectively.

EXAMPLE 1

*Reaction of 3,4-epoxy-6-methylcyclohexylmethyl 3,4-epoxy-6-methylcyclohexanecarboxylate, maleic anhydride and resorcinol*

A mixture was prepared containing 2.8 grams of 3,4-epoxy-6-methylcyclohexylmethyl 3,4-epoxy-6-methylcyclohexanecarboxylate, 0.74 gram of maleic anhydride and 0.55 gram of resorcinol. The amounts of reactants contained in the mixture were such as to provide 0.75 carboxyl equivalent per epoxy equivalent and 0.5 hydroxyl equivalent per epoxy equivalent. The mixture was heated at a temperature in the range of from 100° C. to 110° C. until homogeneous, whereupon the temperature was raised to 120° C. Gelling occurred in 7 minutes at 120° C. The temperature of the reaction mixture was maintained at 120° C. for about 3 hours and then for an additional period of 6 hours at 160° C. There was obtained a yellow resin having a Barcol hardness of 42.

EXAMPLE 2

*Reaction of 3,4-epoxy-6-methylcyclohexylmethyl 3,4-epoxy-6-methylcyclohexanecarboxylate, chlorendic anhydride and diphenylolpropane*

A mixture was prepared containing 2.8 grams of 3,4-epoxy-6-methylcyclohexylmethyl 3,4-epoxy-6-methylcyclohexanecarboxylate, 2.2 grams of chlorendic anhydride and 0.68 gram of diphenylolpropane. The amounts of reactants contained in the mixture were such as to provide 0.6 carboxyl equivalent per epoxy equivalent and 0.3 hydroxyl equivalent per epoxy equivalent. The reaction mixture was heated to a temperature in the range of from 100° C. to 110° C. until homogeneous, whereupon the temperature was raised to 120° C. Gelling occurred in one minute. The gel was brought to and held at a temperature of 120° C. for a period of about 3 hours, whereupon the temperature was raised to 160° C. for an additional 6 hours. There was obtained a colorless resin having a Barcol hardness of 38.

EXAMPLE 3

*Reaction of 3,4-epoxy-6-methylcyclohexylmethyl 3,4-epoxy-6-methylcyclohexanecarboxylate, succinic anhydride and pyrogallol*

A mixture was prepared containing 2.8 grams of 3,4-epoxy-6-methylcyclohexylmethyl 3,4-epoxy-6-methylcyclohexanecarboxylate, 2.0 grams of succinic anhydride and 1.26 grams of pyrogallol. The amounts of reactants contained in the mixture were such as to provide 2.0 carboxyl equivalents per epoxy equivalent and 1.0 hydroxyl equivalent per epoxy equivalent. The mixture gelled immediately at 120° C. The gel was held at a temperature of 120° C. for a period of about 3 hours, whereupon the temperature was raised to 160° C. for 6 hours. A brown, hard resin was obtained.

EXAMPLES 4 THROUGH 18

Fifteen mixtures were prepared, each containing one mol of 3,4-epoxy-6-methylcyclohexylmethyl 3,4-epoxy-6-methylcyclohexanecarboxylate, and the amounts of maleic anhydride and ethylene glycol, as correspondingly listed in Table I below. Each of the mixtures thus prepared contained amounts of epoxide, anhydride and glycol as to provide the carboxyl equivalents of anhydride for each epoxy equivalent and the hydroxyl equivalent of the glycol for each epoxy equivalent, as listed in Table I. Each mixture was heated to a temperature of 120° C. until gelation occurred and then subjected to a post cure at a temperature of 160° C. for a period of 6 hours. The resins had properties correspondingly listed below:

TABLE I

| Ex. | Mol Ratio [1] | Epoxy Equiv./Carboxyl Equiv./Hydroxyl Equiv. | Gel Time, min. at 120° C. | Barcol Hardness | Heat Distortion, ° C. |
|---|---|---|---|---|---|
| 4 | 3/0.5/0.25 | 1.0/0.17/0.083 | no gel | viscous liquid | |
| 5 | 3/1/0.5 | 1.0/0.33/0.17 | 90 | 32 | |
| 6 | 3/2/0.5 | 1.0/0.66/0.17 | 54 | 41 | |
| 7 | 3/2/1 | 1.0/0.66/0.33 | 50 | 40 | 175 |
| 8 | 3/3/1 | 1.0/1.0/0.33 | 45 | 39 | 140 |
| 9 | 3/4/1 | 1.0/1.33/0.33 | 12 | 40 | 120 |
| 10 | 3/5/1 | 1.0/1.66/0.33 | 8 | 37 | 88 |
| 11 | 3/3/1.5 | 1.0/1.0/0.5 | 22 | 38 | 123 |
| 12 | 3/4/2 | 1.0/1.33/0.66 | 20 | 37 | 88 |
| 13 | 3/5/2 | 1.0/1.66/0.66 | 14 | 38 | 79 |
| 14 | 3/6/2 | 1.0/2.0/0.66 | 10 | 37 | 67 |
| 15 | 3/8/2 | 1.0/2.66/0.66 | 5 | 38 | |
| 16 | 3/9/3 | 1.0/3.0/1.0 | 4 | 39 | |
| 17 | 3/10/3 | 1.0/3.33/1.0 | 6 | 30 | |
| 18 | 3/11/3 | 1.0/3.66/1.0 | no gel | | |

[1] Mol ratio of 3,4-epoxy-6-methylcyclohexylmethyl 3,4-epoxy-6-methylcyclohexanecarboxylate, maleic anhydride and glycol, respectively.

EXAMPLES 19 THROUGH 23

Five mixtures were prepared, each containing 3,4-epoxy-6-methylcyclohexylmethyl 3,4-epoxy-6-methylcyclohexanecarboxylate, various cyclic anhydrides and ethylene glycol. The ratio of reactants is reflected in Table II. The mixtures were stirred until homogeneous and poured into a mold. The temperature was maintained at 100° C. until gelation occurred, whereupon the compositions were subjected to a post cure for a period of 6 hours at a temperature of 160° C. The compositions thus prepared had the Barcol hardnesses and heat distortion points correspondingly listed in Table II:

TABLE II

| Anhydride | Epoxy Equiv./Carboxyl Equiv./Hydroxyl Equiv. | Barcol Hardness | Heat Distortion, ° C. |
|---|---|---|---|
| maleic | 1.0/1.0/0.33 | 39 | 140 |
| succinic | 1.0/1.0/0.33 | 25 | 127 |
| methyltetrahydrophthalic | 1.0/1.0/0.33 | 32 | 147 |
| dodecenylsuccinic | 1.0/1.33/0.33 | 19 | 82 |
| phthalic | 1.0/2.0/0.33 | 46 | |

EXAMPLES 24 THROUGH 28

Five mixtures were prepared, each containing 3,4-epoxy-6-methylcyclohexylmethyl 3,4-epoxy-6-methylcyclohexanecarboxylate, maleic anhydride and equivalents of the various polyhydric alcohols listed in Table III. The ratio of reactants is reflected in Table III. The mixtures were heated until homogeneous and poured into molds and the temperature raised to 100° C. until gelation occurred, whereupon the compositions were subjected to a post cure at a temperature of 160° C. for a period of 6 hours. The Barcol hardnesses and heat distortion points of the compositions are correspondingly listed below:

TABLE III

| Alcohol | Epoxy Equiv./Carboxyl Equiv./Hydroxyl Equiv. | Barcol Hardness | Heat Distortion, ° C. |
|---|---|---|---|
| ethylene glycol | 1.0/1.0/0.66 | 39 | 140 |
| tetraethylene glycol | 1.0/1.0/0.66 | 22 | 105 |
| 1,2,6-hexanetriol | 1.0/1.0/0.66 | 39 | 172 |
| glycerol | 1.0/1.0/0.33 | 45 | 214 |

EXAMPLE 29

*Reaction of 3,4-epoxycyclohexylmethyl 3,4-epoxycyclohexanecarboxylic, maleic anhydride and ethylene glycol*

A mixture was prepared containing 3,4-epoxycyclohexylmethyl 3,4-epoxycyclohexanecarboxylate, maleic anhydride and ethylene glycol in amounts such as to provide 1.33 carboxyl equivalents per epoxy equivalent and 0.33 hydroxyl equivalent per epoxy equivalent. The mixture was poured into a mold in the form of a bar and cured for a period of 2 hours at 120° C. and subjected to a post cure for 6 hours at a temperature of 160° C. The cast bar had the following physical properties:

Heat distortion point, 264 p.s.i _____ ° C__ 93
Izod impact, ft. lb./in. notch _____ 0.2
Barcol hardness _____ 47

EXAMPLE 30

*Reaction of 3,4-epoxy-6-methylcyclohexylmethyl 3,4-epoxy-6-methylcyclohexanecarboxylate, polyadipic anhydride and ethylene glycol*

A mixture was prepared containing 3,4-epoxy-6-methylcyclohexylmethyl 3,4-epoxy-6-methylcyclohexanecarboxylate, polymeric adipic anhydride and ethylene glycol in amounts such as to provide 1.0 carboxyl equivalent per epoxy equivalent and 0.33 hydroxyl equivalent per epoxy equivalent. The mixture was stirred until homogeneous. The temperature of the mixture was raised to 120° C. and the gel was formed in 45 minutes. The gel was subjected to a post cure for 6 hours at a temperature of 160° C. A tough resin was obtained which had a Barcol hardness of 27.

EXAMPLE 31

*Basic catalysis of 3,4-epoxy-6-methylcyclohexylmethyl 3,4-epoxy-6-methylcyclohexanecarboxylate-maleic anhydride-ethylene glycol systems*

Three mixtures were prepared containing 3,4-epoxy-6-methylcyclohexylmethyl 3,4-epoxy-6-methylcyclohexanecarboxylate, maleic anhydride and ethylene glycol in amounts such as to provide 1.0 carboxyl equivalent per epoxy equivalent and 0.33 hydroxyl equivalent per epoxy equivalent. Castings were made using potassium hydroxide in one instance, benzyldimethylamine in another, and the third mixture did not contain a catalyst. The data illustrated in Table IV illustrate that basic catalysis is effective in accelerating the reaction and also increases the observed heat distortion points.

TABLE IV

| Catalyst | Catalyst Conc., percent | Gel Time, min., 80° C. | Heat Distortion, ° C. |
|---|---|---|---|
| none | | 45 (120° C.) | 140 |
| benzyldimethylamine | 0.04 | 15 | 175 |
| potassium hydroxide | 0.002 | 14 | 166 |

EXAMPLE 32

*Acidic catalysis of 3,4-epoxy-6-methylcyclohexylmethyl 3,4-epoxy-6-methylcyclohexanecarboxylate-maleic anhydride-ethylene glycol system*

A mixture similar to the mixture of Example 31 was prepared, wherein the reaction was catalyzed by the addition of 0.03 percent by weight of stannic chloride and subsequently gelled after 3 minutes at a temperature of 80° C. After curing for 6 hours at 160° C., the resin obtained had a Barcol hardness of 44. Note that in Examples 4–18 the same mixture without a catalyst gelled in 45 minutes at a temperature of 120° C. Thus, acidic catalysts are also effective in accelerating the reaction.

EXAMPLE 33

*Reaction of 3,4-epoxy-6-methylcyclohexylmethyl 3,4-epoxycyclohexanecarboxylate, chlorendic anhydride and ethylene glycol*

A mixture was prepared containing 3,4-epoxy-6-methylcyclohexylmethyl 3,4-epoxy-6-methylcyclohexanecarboxylate, chlorendic anhydride and ethylene glycol in amounts such as to provide 1.0 carboxyl equivalent per epoxy equivalent and 0.33 hydroxyl equivalent per epoxy equivalent. The mixture was heated to 80° C. and maintained thereat for a period of 5 hours. A gel was obtained after 4 minutes at 80° C. After a post cure of 6 hours at 160° C. the resulting resin had the following physical properties:

Heat distortion point, 264 p.s.i. _____° C__ 183
Izod impact, ft. lb./in. notch _____ 0.1
Barcol hardness _____ 41

EXAMPLE 34

*Reaction of 3,4-epoxy-6-methylcyclohexylmethyl 3,4-epoxy-6-methylcyclohexanecarboxylate, chlorendic anhydride and a polyethylene glycol*

A mixture was prepared containing 3,4-epoxy-6-methylcyclohexylmethyl 3,4-epoxy-6-methylcyclohexanecarboxylate, chlorendic anhydride and a polyethylene glycol with an average molecular weight of 200 in amounts such as to provide 1.0 carboxyl equivalent per epoxy equivalent and 0.33 hydroxyl equivalent per epoxy equivalent. The mixture was heated to 80° C. and maintained thereat for 3.5 hours with a gel being formed after 5 minutes at 80° C. After a post cure of 6 hours at 160° C. the resulting resin had the following physical properties:

Heat distortion point, 264 p.s.i. _____° C__ 178
Izod impact, ft. lb./in. notch _____ 0.2
Barcol hardness _____ 35

EXAMPLE 35

*Reaction of 3,4-epoxy-6-methylcyclohexylmethyl 3,4-epoxy-6-methylcyclohexanecarboxylate, maleic anhydride, and 2,4,6-trimethylolphenyl allyl ether*

A mixture was prepared containing 3,4-epoxy-6-methylcyclohexylmethyl 3,4-epoxy-6-methylcyclohexanecarboxylate, maleic anhydride and 2,4,6-trimethylolphenyl allyl ether in amounts such as to provide 1.0 carboxyl equivalent per epoxy equivalent and 0.33 hydroxyl equivalent per epoxy equivalent. The mixture was heated until homogeneous (about 40° C.) and then allowed to cool to room temperature (26° C.). The resulting mixture was allowed to stand at room temperature for 72 hours during which time a hard, rigid resin was formed. After curing the resulting resin for 6 hours at 160° C. there was obtained a resin with the following physical properties:

Heat distortion point, 264 p.s.i. _____° C__ 190
Izod impact, ft. lb./in. notch _____ 0.2
Barcol hardness _____ 50

EXAMPLE 36

*Reaction of 3,4-epoxy-6-methylcyclohexylmethyl 3,4-epoxy-6-methylcyclohexanecarboxylate, maleic anhydride and 1,1,1-trimethylolethane*

A mixture was prepared containing 3,4-epoxy-6-methylcyclohexylmethyl 3,4-epoxy-6-methylcyclohexanecarboxylate, maleic anhydride and 1,1,1-trimethylolethane in amounts such as to provide 1.0 carboxyl equivalent per epoxy equivalent and 0.33 hydroxyl equivalent per epoxy equivalent. The mixture was heated to 80° C. and maintained thereat for 4.75 hours with gelation occurring after 7 minutes at 80° C. After a post cure of 1 hour at 120° C. plus 6 hours at 160° C. there was obtained a resin with the following physical properties:

Heat distortion point, 264 p.s.i. _____° C__ 198
Barcol hardness _____ 54

EXAMPLE 37

*Reaction of 3,4-epoxy-6-methylcyclohexylmethyl 3,4-epoxy-6-methylcyclohexanecarboxylate, maleic anhydride and diphenylolpropane*

A mixture was prepared containing 3,4-epoxy-6-methylcyclohexylmethyl 3,4-epoxy-6-methylcyclohexanecarboxylate, maleic anhydride and diphenylolpropane in amounts such as to provide 1.0 carboxyl equivalent per epoxy equivalent and 0.33 hydroxyl equivalent per epoxy equivalent. The mixture was heated to 120° C. and maintained thereat for about 23 hours. After a post cure of 6 hours at 160° C. there was obtained a resin with the following physical properties:

Heat distortion point, 264 p.s.i. _____° C__ 157
Izod impact, ft. lb./in. notch _____ 0.2
Barcol hardness _____ 46

EXAMPLE 38

*Reaction of 3,4-epoxycyclohexylmethyl 3,4-epoxycyclohexanecarboxylate with maleic anhydride and ethylene glycol*

A mixture was prepared from 21.9 grams of 3,4-epoxycyclohexylmethyl 3,4-epoxycyclohexanecarboxylate, 11.3 grams of maleic anhydride and 1.8 grams of ethylene glycol in such proportions as to provide 1.33 carboxyl equivalents per epoxy equivalent and 0.33 hydroxyl equivalent per epoxy equivalent. The mixture was heated to 120° C. and maintained thereat for a period of 2 hours during which time a gel was formed. After an additional cure of 6 hours at 160° C. there was obtained a resin with the following physical properties:

Heat distortion point, 264 p.s.i. _____ ° C__ 93
Izod impact, ft. lb./in. notch _____ 0.2
Barcol hardness _____ 47

EXAMPLE 39

*Reaction of bis(3,4-epoxy-6-methylcyclohexylmethyl) succinate with maleic anhydride and ethylene glycol*

A mixture was prepared from 24.4 grams of bis(3,4-epoxy-6-methylcyclohexylmethyl)succinate, 9.2 grams of maleic anhydride and 1.4 grams of ethylene glycol in such proportions as to provide 1.33 carboxyl equivalents per epoxy equivalent and 0.33 hydroxyl equivalent per epoxy equivalent. The mixture was heated to 120° C. and maintained thereat for a period of 2 hours during which time a gel was formed. After an additional cure of 6 hours at 160° C. there was obtained a resin with the following physical properties:

Heat distortion point, 264 p.s.i. _____ ° C__ 82
Izod impact, ft. lb./in. notch _____ 0.3
Barcol hardness _____ 33

EXAMPLE 40

*Reaction of 1,6-hexanediol bis(3,4-epoxycyclohexanecarboxylate) with maleic anhydride and ethylene glycol*

A mixture was prepared from 5.5 grams of 1.6-hexanediol bis(3,4-epoxycyclohexanecarboxylate), 1.96 grams of maleic anhydride and 0.31 gram of ethylene glycol in such proportions as to provide 1.33 carboxyl equivalents per epoxy equivalent and 0.33 hydroxyl equivalent per epoxy equivalent. The mixture was heated to 120° C. and maintained thereat for a period of 2 hours during which time a gel was formed. After an additional cure of 6 hours at 160° C. there was obtained a tough, yellow colored resin which had a Barcol hardness of 18.

EXAMPLE 41

*Reaction of bis(3,4-epoxycyclohexylmethyl) terphthalate with maleic anhydride and glycerol*

A mixture was prepared from 23.5 grams of bis (3,4-epoxycyclohexylmethyl) terphthalate, 9.5 grams of maleic anhydride and 2.0 grams of glycerol in such proportions as to provide 1.0 carboxyl equivalent per epoxy equivalent and 0.33 hydroxyl equivalent per epoxy equivalent. The mixture was heated to 120° C. and maintained thereat for a period of 6.5 hours with a gel being formed after the first 2 minutes at 120° C. After an additional cure of 6 hours at 160° C. there was obtained a resin with the following physical properties:

Heat distortion point, 264 p.s.i._____ ° C__ 141
Izod impact, ft.lb./in. notch_____ 0.5
Barcol hardness_____ 41

EXAMPLE 42

*Reaction of 2-butene-1,4-diol bis(3,4-epoxycyclohexanecarboxylate) with maleic anhydride and glycerol*

A mixture was prepared from 25.8 grams of 2-butene-1,4-diol bis(3,4-epoxycyclohexanecarboxylate), 7.6 grams of maleic anhydride and 1.6 grams of glycerol in such proportions as to provide 1.0 carboxyl equivalent per epoxy equivalent and 0.33 hydroxyl equivalent per epoxy equivalent. The mixture was heated to 80° C. and maintained thereat for 2 hours with gelation occurring at about 1 hour. After an additional cure of 6 hours at 120° C. and 6 hours at 160° C. there was obtained a resin with the following physical properties:

Heat distortion point, 264 p.s.i._____ ° C__ 118
Izod impact, ft.lb./in. notch_____ 0.2
Barcol hardness_____ 32

What is claimed is:

1. Curable compositions comprising (a) 3,4-epoxy-6-methylcyclohexylmethyl 3,4-epoxy-6-methylcyclohexanecarboxylate; (b) succinic anhydride having $x$ carboxyl groups per epoxy group of said epoxide; and (c) ethylene glycol having $z$ hydroxyl groups per epoxy group of said diepoxide, wherein $x$ is a number in the range of from 0.1 to 4.0; $z$ is a number in the range of from 0.01 to 1.0; the sum of $x$ and $z$ is not greater than 4.0 and $x/z$ is at least 1.0.

2. Curable compositions comprising (a) 3,4-epoxy-6-methylcyclohexylmethyl 3,4-epoxy-6-methylcyclohexanecarboxylate; (b) chlorendic anhydride having $x$ carboxyl groups per epoxy group of said epoxide; and (c) ethylene glycol having $z$ hydroxyl groups per epoxy group of said diepoxide, wherein $x$ is a number in the range of from 0.1 to 4.0; $z$ is a number in the range of from 0.01 to 1.0; the sum of $x$ and $z$ is not greater than 4.0 and $x/z$ is at least 1.0.

3. Curable compositions comprising (a) 3,4-epoxy-6-methylcyclohexylmethyl 3,4-epoxy-6-methylcyclohexanecarboxylate; (b) chlorendic anhydride having $x$ carboxyl groups per epoxy group of said epoxide; and (c) tetraethylene glycol having $z$ hydroxyl groups per epoxy group of said diepoxide, wherein $x$ is a number in the range of from 0.1 to 4.0; $z$ is a number in the range of from 0.01 to 1.0; the sum of $x$ and $z$ is not greater than 4.0 and $x/z$ is at least 1.0.

4. Curable compositions comprising (a) epoxides characterized by the general formula:

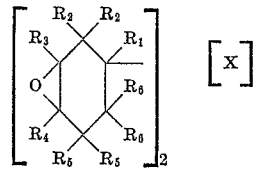

wherein X represents divalent radicals selected from the group consisting of

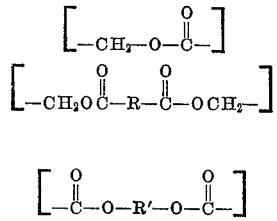

and $$\left[ -\overset{O}{\underset{\|}{C}}-O-R'-O-\overset{O}{\underset{\|}{C}}- \right]$$

in which R represents members selected from the group consisting of aliphatic and aromatic hydrocarbon groups containing from two through twelve carbon atoms, R' represents members selected from the group consisting of lower aliphatic hydrocarbon groups and lower oxyalkylene groups and $R_1$ through $R_6$ represent members selected from the group consisting of hydrogen and lower alkyl groups; (b) a polycarboxylic acid anhydride having $x$ carboxyl groups per epoxy group of said epoxide; and (c) a polyol selected from the group consisting of polyhydric alcohols and polyhydric phenols having $z$ hydroxyl groups per epoxy group of said epoxide, wherein $x$ is a number in the range of from 0.1 to 4.0; $z$ is a number in the range of from 0.01 to 1.0; the sum of $x$ and $z$ is not greater than 4.0; and $x/z$ is at least 1.0.

5. Curable compositions comprising (a) epoxides characterized by the general formula:

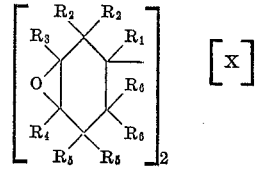

wherein X represents divalent radicals selected from the group consisting of

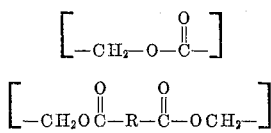

and

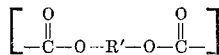

in which R represents members selected from the group consisting of aliphatic and aromatic hydrocarbon groups containing from two through twelve carbon atoms, R' represents members selected from the group consisting of lower aliphatic hydrocarbon groups and lower oxyalkylene groups and $R_1$ through $R_6$ represent members selected from the group consisting of hydrogen and lower alkyl groups; (b) a polycarboxylic acid anhydride having $x$ carboxyl groups per epoxy group of said epoxide; and (c) a polyol selected from the group consisting of polyhydric alcohols and polyhydric phenols having $z$ hydroxyl groups per epoxy group of said epoxide, wherein $x$ is a number in the range of from 0.5 to 2.0; $z$ is a number in the range of from 0.01 to 1.0; the sum of $x$ and $z$ is not greater than 2.0; and $x/z$ is at least 1.0.

6. Curable compositions comprising (a) 3,4-epoxy-6-methylcyclohexylmethyl 3,4-epoxy-6-methylcyclohexanecarboxylate; (b) maleic anhydride having $x$ carboxyl groups per epoxy group of said epoxide; and (c) trimethylolpropane having $z$ hydroxyl groups per epoxy group of said epoxide, wherein $x$ is a number in the range of from 0.1 to 4.0; $z$ is a number in the range of from 0.01 to 1.0; the sum of $x$ and $z$ is not greater than 4.0 and $x/z$ is at least 1.0.

7. Curable compositions comprising (a) 3,4-epoxy-6-methylcyclohexylmethyl 3,4-epoxy-6-methylcyclohexanecarboxylate; (b) maleic anhydride having $x$ carboxyl groups per epoxy group of said epoxide; and (c) glycerol having $z$ hydroxyl groups per epoxy group of said epoxide, wherein $x$ is a number in the range of from 0.1 to 4.0; $z$ is a number in the range of from 0.01 to 1.0; the sum of $x$ and $z$ is not greater than 4.0 and $x/z$ is at least 1.0.

References Cited in the file of this patent

UNITED STATES PATENTS

| | | |
|---|---|---|
| 2,602,785 | Wiles et al. | July 8, 1952 |
| 2,716,123 | Frostick et al. | Aug. 23, 1955 |
| 2,720,500 | Cody | Oct. 11, 1955 |
| 2,750,395 | Phillips et al. | June 12, 1956 |

FOREIGN PATENTS

| | | |
|---|---|---|
| 530,335 | Canada | Sept. 11, 1956 |

UNITED STATES PATENT OFFICE
CERTIFICATE OF CORRECTION

Patent No. 2,890,196

June 9, 1959

Benjamin Phillips et al.

It is hereby certified that error appears in the printed specification f the above numbered patent requiring correction and that the said Letters atent should read as corrected below.

Column 1, line 62, for "resistent" read -- resistant --; column 2, line 72, after "compositions" insert -- comprising --; column 4, line 34, for "polyal" read -- polyol --; column 8, line 3, after "of" insert -- a --; line 43, after "acetone" insert a comma; column 10, line 50, in the heading to Example 29, for the italicized "hexanecarboxylic" read an italicized -- hexanecarboxylat column 13, line 31, for "1.6-hexane-" read -- 1,6-hexane- --.

Signed and sealed this 19th day of July, 1960.

(SEAL)
test:
KARL H. AXLINE
testing Officer

ROBERT C. WATSON
Commissioner of Patents